United States Patent
Chen (10) Patent No.: US 9,352,284 B2
(45) Date of Patent: May 31, 2016

(54) ENZYMATIC TREATMENT OF ALGINATE TO REDUCE MEMBRANE FOULING FOR WATER OR WASTEWATER PURIFICATION

(75) Inventor: Dong Chen, Fort Wayne, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 13/552,746

(22) Filed: Jul. 19, 2012

(65) Prior Publication Data

US 2013/0037484 A1 Feb. 14, 2013

Related U.S. Application Data

(60) Provisional application No. 61/510,576, filed on Jul. 22, 2011.

(51) Int. Cl.
| | |
|---|---|
| *B01D 61/00* | (2006.01) |
| *B01D 65/02* | (2006.01) |
| *C02F 1/44* | (2006.01) |
| *B01D 65/08* | (2006.01) |
| *B01D 61/14* | (2006.01) |

(52) U.S. Cl.
CPC ............... *B01D 65/08* (2013.01); *B01D 65/02* (2013.01); *B01D 61/145* (2013.01); *B01D 61/147* (2013.01); *B01D 2321/04* (2013.01); *B01D 2321/14* (2013.01); *B01D 2321/166* (2013.01)

(58) Field of Classification Search
USPC ......................... 210/632, 636, 606, 777–779; 435/262–264
See application file for complete search history.

(56) References Cited

U.S. PATENT DOCUMENTS

| | | | |
|---|---|---|---|
| 5,326,449 A | 7/1994 | Cunningham | |
| 5,624,537 A | 4/1997 | Turner et al. | |
| 2004/0217052 A1* | 11/2004 | Baldridge et al. | 210/632 |
| 2005/0184008 A1* | 8/2005 | Schacht et al. | 210/636 |
| 2009/0188861 A1 | 7/2009 | Higgin | |

(Continued)

OTHER PUBLICATIONS

Howell, J. A., and O. Velicangil. "Theoretical considerations of membrane fouling and its treatment with immobilized enzymes for protein ultrafiltration." Journal of Applied Polymer Science 27.1 (1982): 21-32.*

(Continued)

*Primary Examiner* — Krishnan S Menon
(74) *Attorney, Agent, or Firm* — Douglas G. Gallagher; Brian W. Chellgren; Bingham Greenebaum Doll LLP (57) ABSTRACT

This disclosure examines using alginate lyase to catalytically degrade alginate in order to decrease affinity and fouling potential to membranes of 0.2 and 0.02 μm pore size, respectively within a process line of a filtration system. Enzymatically treated alginate caused less fouling on both ultrafiltration and microfiltration membranes than original alginate. Enzymatically treated alginate is predicted to cause less fouling on both membranes within the pH range of approximately 3.0 to approximately 10.0. Without the presence of calcium cation, alginate lyase reduced the foulant resistance by more than 82% for both membranes. In the presence of 1 mM calcium cation, alginate lyase reduced the foulant resistance by more than 55%. In addition, the foulant structure composed of enzymatically treated alginate was more readily removed by backwashing, suggesting reversible fouling. The advantages of using enzymatic technique to control membrane fouling include high efficiency and no damage to the membrane materials.

25 Claims, 6 Drawing Sheets

(56) References Cited

U.S. PATENT DOCUMENTS

2011/0062078 A1 3/2011 Makardij-Tossonian
2012/0206549 A1* 8/2012 Tabayashi ................. 347/101

OTHER PUBLICATIONS

Katsoufidou, K., S. G. Yiantsios, and A. J. Karabelas. "Experimental study of ultrafiltration membrane fouling by sodium alginate and flux recovery by backwashing." Journal of Membrane Science 300.1 (2007): 137-146.*

Wong, Thiang Yian, Lori A. Preston, and Neal L. Schiller. "Alginate lyase: review of major sources and enzyme characteristics, structure-function analysis, biological roles, and applications." Annual Reviews in Microbiology 54.1 (2000): 289-340.*

Hong, Seungkwan, and Menachem Elimelech. "Chemical and physical aspects of natural organic matter (NOM) fouling of nanofiltration membranes." Journal of membrane science 132.2 (1997): 159-181.*

Larsen et al., "Kinetics and specificity of alginate lyases", Hydrobiologia 260/261; 557-561, 1993.*

Chin, Yu-Ping, et al, Molecular Weight, Polydispersity, and Spectroscopic Properties of Aquatic Humic Substances, Environ. Sci. Technol. 1994, pp. 1853-1858, vol. 28, American Chemical Society.

* cited by examiner

ENZYMATIC TREATMENT OF ALGINATE TO REDUCE MEMBRANE FOULING FOR WATER OR WASTEWATER PURIFICATION

CROSS REFERENCE TO RELATED APPLICATION

This application claims the benefit of U.S. Provisional Application No. 61/510,576, filed Jul. 22, 2011, the disclosure of which is expressly incorporated by reference.

FIELD

This disclosure relates to use of enzymes to cleave alginate in order to reduce membrane fouling in water or wastewater applications.

BACKGROUND

Population growth and economic development are placing increasing demands on limited fresh water resources worldwide. When natural water resources are not enough to meet the requirements of water supply, it is prudent to reuse treated wastewater. Water and wastewater reuse has proven to be effective and successful in creating a new and a reliable water supply. This is a sustainable approach and can be cost-effective in the long term. Nonpotable reuse is a widely accepted practice that will continue to grow in many parts of the world. Accordingly, the US EPA published a technical document titled "Guidelines for Water Reuse" in 2004 to ensure the safety of water recycling projects. In order to meet the quality requirement for wastewater reuse, advanced treatment technologies are necessary.

Membrane filtration technologies have been widely used in desalination and advanced water and wastewater treatment practices. Depending on the membrane pore size or the removal threshold, most of the contaminants in water such as pesticides, herbicides, pharmaceutical compounds, heavy metals, viruses, and bacteria can be removed in a single step. Consequently, the end product water is highly pure. Wider application of the membrane technologies is driven by increasingly stringent regulations for finished water quality. Therefore, multiple membrane processes are regarded as key elements of advanced wastewater treatment and reuse schemes. However, one of the main barriers to greater use of membrane technologies is membrane fouling, which is caused by deposition and/or adsorption of water impurities such as organic substances and particulates on the membrane surface and/or in the pores. As a result, productivity of the membranes declines significantly with filtration time. Membrane fouling affects both the quality and the quantity of the end product water and ultimately shortens the membrane life if the fouling is irreversible. It has been reported that membrane replacement due to fouling is the single largest operating cost.

Among various foulants in the secondary effluent of wastewater, polysaccharides are the most ubiquitous macromolecules and have been identified as a key group of membrane foulants. Polysaccharides originate from the extracellular polymeric carbohydrates secreted by microorganisms in wastewater. Therefore, a solution to the fouling problem caused by polysaccharides is of great importance in both fundamental research and wastewater reclamation practice.

Alginate is a commonly used model polysaccharide found in the secondary effluent of wastewater. Alginate produced by bacteria plays an important role in bioflocculation and is a relatively well studied typical polysaccharide. Prior studies indicated that the enzyme of alginate lyase effectively degraded and depolymerized alginate into smaller molecules. However, we are unaware of any other research regarding the effect of alginate lyase to reduce membrane fouling for water or wastewater reuse.

SUMMARY

The present disclosure includes a method of reducing membrane fouling by organic substances in water or wastewater treatment, the method comprising the steps of introducing enzyme to water or wastewater on the concentrate side of a membrane.

The present disclosure also includes a method of reducing membrane fouling and promoting reversible membrane fouling by alginate in water treatment, the method comprising the steps of introducing alginate lyase to water, filtering water with alginate lyase, wherein a membrane is less fouled and reversibly fouled by alginate, and cleaning or regeneration of alginate fouled membranes within a filtration process line.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

Compared to conventional methods for membrane fouling control, enzymatic technique is an attractive approach because enzymes play a critical role in organic degradation and transformation processes. In addition, enzymes are unlikely to damage membrane materials, because enzymes are highly specific for their substrate. As a result, enzymes may be used in the process line of the filtration system to degrade dissolved effluent organic substances including polysaccharides and decrease the affinity of organic substances to the membrane in order to mitigate fouling or to clean the membrane. Consequently, the membrane may be maintained in a cleaned condition for an extended period of time. The enzymatic technique may reduce the need for chemical cleaning agents and costly process interruptions and energy consumptions inherent with traditional approaches.

This disclosure explores the efficiency of alginate lyase to catalytically degrade alginate and the consequent effects on the fouling behaviors of ultrafiltration and microfiltration membranes. It has been hypothesized that the degraded products of smaller molecular weight (MW) might have less fouling potential to the membrane than untreated alginate, because of higher diffusivity and less attachment/affinity to the membranes. As a result, degraded products of smaller molecular weight are more readily removed from the membrane pores and surfaces. According to Cornel et al.[1], diffusivity ($D_L$) of Aldrich humic acid increases with smaller MW ($D_L \propto MW^{-0.2}$). In addition, the enzymes have a high molecular weight. The enzymes may be retained in the concentrate side of the membranes. Consequently, the enzymes may continually degrade polysaccharides in the membrane foulant layer and in the feed solution during the membrane processes. This effect may promote further fouling prevention and even membrane cleaning.

[1] P. K. Cornel, R. S. Summers, P. V. Roberts, Diffusion of humic acid in dilute aqueous solution, J. Colloid Interf. Sci. 110 (1986) 149-164.

This disclosure explores using the enzyme of alginate lyase to catalytically degrade alginate in order to decrease the affinity and fouling potential of alginate to $\gamma$-$Al_2O_3$ membranes of 0.2 and 0.02 μm pore size, respectively. It is proposed that these methods are effective with several types of membranes, including ceramic membranes and polymeric membranes, such as microfiltration, ultrafiltration, nanofiltration, reverse osmosis, and forward osmosis membranes. Results show that the enzyme reduced fouling of both membranes and improved the permeate recovery rate of backwashing. Size exclusion chromatography indicates a significant decrease in molecular weight of alginate after 2 hours of enzymatic reactions. Enzymatically treated alginate within the range of approximately 8 mg $L^{-1}$ to approximately 325 mg $L^{-1}$ initial alginate concentration caused less fouling on both membranes than original alginate at each approximately pH 6.7±0.2 and approximately pH 9.0±0.1, ionic strength within the range of approximately 0.006 to approximately 0.075 M, and in the presence or absence of 1 mM calcium cation ($Ca^{2+}$). Alginate lyase reduced the foulant resistance by more than 82% without the presence of calcium cation. In the presence of 1 mM calcium cation, alginate lyase reduced the foulant resistance by more than 55%. In addition, the foulant structure composed of treated alginate was more readily removed by backwashing, suggesting reversible fouling. Compared to the 0.2 μm membrane, alginate lyase provided an enhancement of backwashing of the 0.02 μm membrane with a greater than 92% recovery rate obtained in the absence of calcium. Higher permeate recovery rates through backwash were found with enzymatically treated alginate in the presence of 1 mM calcium cation. The advantages of using enzymatic technique to control membrane fouling include high efficiency and no damage to the membrane materials.

Materials and Methods

Alginate and Alginate Lyase

Ultrapure deionized ("DI") water (R=18.2 MΩ·cm) was used in this study. A commercial alginate (also known as algin or alginic acid) was purchased as the sodium salt from Sigma-Aldrich (St. Louis, Mo.). A stock solution was prepared by complete dissolution of 325 mg $L^{-1}$ alginic acid in DI water. The measured Chemical Oxygen Demand by Chromium (VI) ("COD(Cr(VI)") was 200 mg $L^{-1}$, though it is envisioned that up to approximately 1000 mg $L^{-1}$ will provide similar results. Alginate Lyase (also described as the "enzyme") from *Flavobacterium* sp. in solid powder was purchased from Sigma-Aldrich (St. Louis, Mo.). The enzyme contained more than 10,000 units $g^{-1}$ solid. All other chemicals were reagent grade and used without further purifications.

The enzymatic reactions were carried out in a completely mixed batch reaction mode. pH and temperature were controlled at approximately 6.7±0.2 or approximately 9.0±0.1 and 20±1° C., respectively. Different amounts of alginate lyase were dissolved in DI water before mixing with the alginate solution. For 325 mg $L^{-1}$ alginate, the enzymatic reaction was conducted for two hours before membrane filtration or molecular weight analysis. For 8 mg $L^{-1}$ alginate, the reaction time was conducted for 30 minutes.

Membranes and Filtration Tests

Anodisc™ $\gamma$-$Al_2O_3$ ceramic membranes with a polypropylene support ring from Whatman (Clifton, N.J.) were used in all experiments. The microfiltration and ultrafiltration membranes with the pore size of 0.2 and 0.02 μm, respectively, were used in this study. The diameter and the thickness of the membranes were 47 mm and 60 μm, respectively. The 0.2 μm microfiltration membrane had a uniform pore size throughout the membrane. The 0.02 μm ultrafiltration membrane was not uniform, i.e., the pore size of the membranes was 0.2 μm through most of the membrane cross-section, and narrowed to 0.02 μm for 2-3 μm at the top membrane surface (facing the feed side). Both of the membranes were hydrophilic with a contact angle less than 30° measured by the Sessile Drop method. The isoelectric point was pH 7.3±0.4 and pH 8.1 for the 0.02 and 0.2 μm membranes, respectively. The membranes were soaked in DI water overnight and rinsed with DI water again prior to use.

All filtration experiments were performed at 34.5 kPa (5 psi) and 20±1° C. using an unstirred dead-end filtration system (Amicon 8050, Millipore). A one-gallon pressure vessel containing 1.0 L to 1.5 L bulk feed solution was connected to the 50 mL membrane cell of 44.5 mm diameter. The polypropylene support ring of the membranes was partially cut to fit the membrane cell. If calcium was present, approximately 1 mM of $CaCl_2$ was added to the alginate solution. KCl was used as a background electrolyte to maintain a constant ionic strength of approximately 0.006 M or approximately 0.075 M in the feed solution and pH was controlled at approximately 6.7±0.2 or approximately 9.0±0.1 during all filtration tests. Prior to the filtration tests, DI water of approximately 0.006 M or approximately 0.075 M ionic strength was run through the membrane cell to remove impurities and allow the permeate flux to stabilize. The membrane permeate flux was monitored by periodic gravimetric analyses.

Backwashing of the membranes was performed immediately after 50-minute or 60-minute filtration to examine the reversibility of fouling. The term backwashing means that the flow direction through the fouled membranes was reversed (compared to the normal filtration) by feeding the system with DI water at 34.5 kPa. However, enzyme solution can be used to backwash the membrane also. The permeate flux was recorded during backwashing.

Normalized permeate flux, $J/J_0$, was used to evaluate membrane fouling under different conditions. The clean water permeate flux ($J_0$) was determined by filtration of DI water with the same ionic strength as the alginate solutions. $J_0$ was determined as 32.57 and 10.72 g min$^{-1}$ at approximately 0.075 M ionic strength and 34.5 kPa for 0.2 and 0.02 μm membranes, respectively. At the ionic strength of approximately 0.006 M, because of a decrease in electro-viscosity, $J_0$ was slightly higher, which was 33.10 and 10.90 g min$^{-1}$ at 34.5 kPa for 0.2 and 0.02 μm membranes, respectively.

Analytical Methods

Molecular weight distributions of alginate without calcium and alginate lyase before and after enzymatic reactions were measured by a high-performance liquid chromatography system (Hewlett Packard 1050) equipped with a size exclusion column (Protein-Pak 125, Waters Associates, Milford, Mass.). The mobile phase was sodium phosphate buffer of pH 6.7 with an ionic strength of approximately 0.075 M. The flow rate was 1 mL min$^{-1}$ and the UV detector was set at 235 nm. The injection volume of the enzyme-reacted alginate solution was reduced because of its strong absorbance at 235 nm. Calibration was performed using sodium polystyrene sulfonates (Polysciences, Warrington, Pa.) with molecular weight of 67K, 18K, 8K, 4.6K, and 1.8K, respectively, and acetone.

Results and Discussion

Enzymatic Degradation of Alginate

Figure 1:
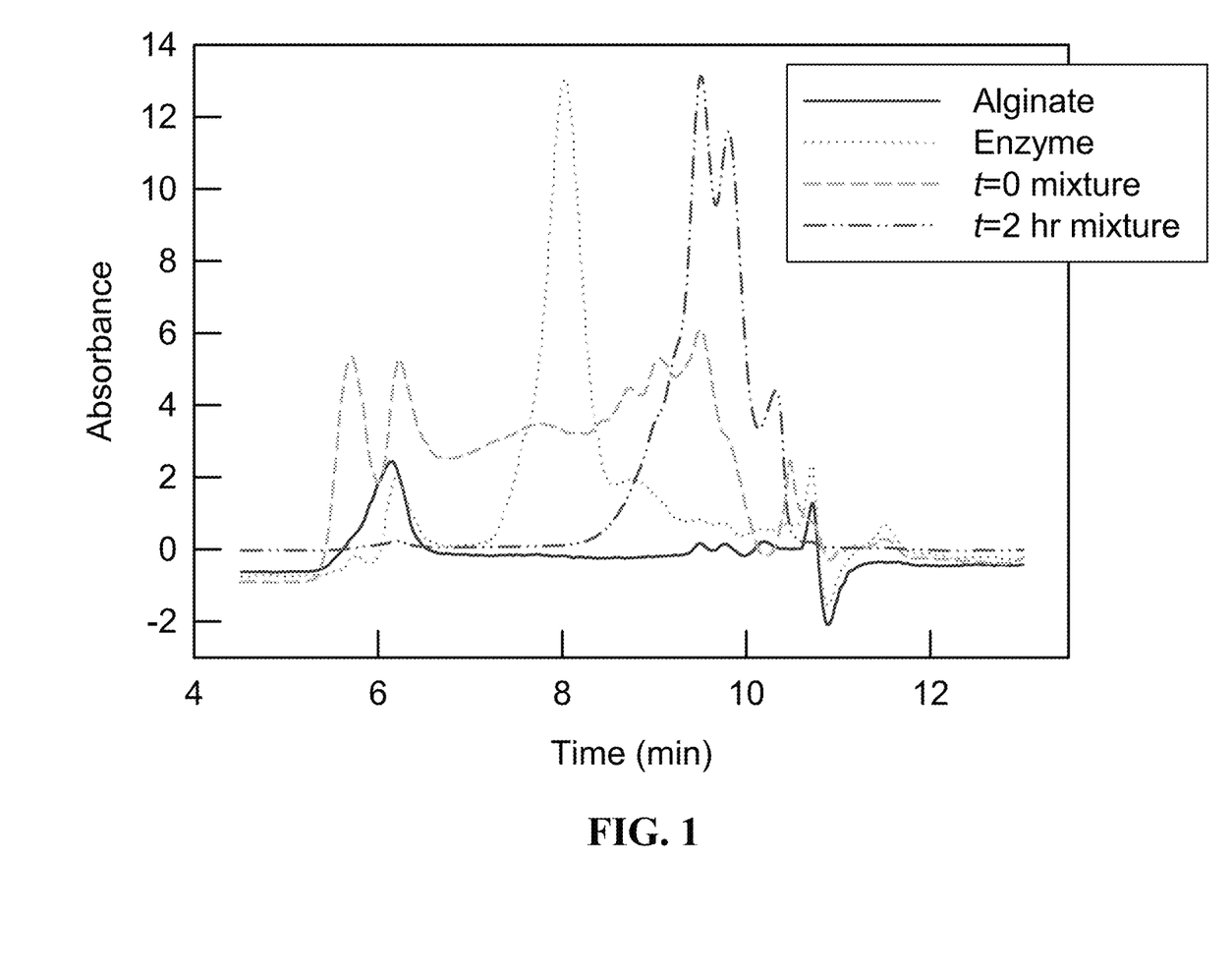
FIG. 1 illustrates size exclusion chromatographic spectra of alginate, enzyme, and their mixtures before and after 2-hr reactions.

Alginate is a polysaccharide copolymer made of α-L-guluronic (G) and 1-4-linked β-D-mannuronic (M) acid groups. It has a block structure: homopolymeric blocks of L-guluronic acid (GG) and of mannuronic acid (MM), and heteropolymeric blocks (MG) in which the two acids alternate. Alginate lyase catalytically depolymerizes alginate by a β-elimination mechanism, leading to the formation of 4-deoxy-L-erythro-hex-4-ene pyranosyluronate at the nonreducing end of the resultant product. The resulting double bond is known to absorb UV light around 235 nm. To directly observe the molecular weight change as a result of enzymatic reactions, size exclusion chromatograms (SEC) of alginate, the enzyme, and their mixtures (approximately 20 mg L$^{-1}$ alginate lyase added to approximately 325 mg L$^{-1}$ alginate) both before and after reaction are shown in FIG. 1. In SEC, larger molecules emerge earlier than smaller molecules. The results indicated that after 2 hours of reaction the peaks shifted to longer retention times relative to the initial mixture of the enzyme and alginate, suggesting a decrease in molecular weight as a result of enzymatic action. In addition, the initial mixture of the enzyme and alginate appeared as broad peaks in the chromatogram. Its first peak emerged even earlier than the original alginate. The likely explanation is that enzymatic reactions started immediately after alginate lyase was added to the alginate solution and progressed rapidly during the SEC measurement. The enzyme-bound alginate had a larger molecular weight than both alginate and alginate lyase, which made the peak appear earlier. The great amounts of reaction intermediates of diverse molecular weight at the early stage of reactions broadened the peaks of the chromatogram.

Table 1 lists the weight-averaged ($M_w$), number-averaged ($M_n$) molecular weight and the polydispersity ($M_w/M_n$) of alginate, the enzyme and their mixtures. The $M_w$ and $M_n$ of the unreacted alginate was 35,500 and 3,900 Daltons (Da), respectively. It had a high polydispersity of 9.10, suggesting a broad range of molecular weight. Alginate lyase had a smaller $M_w$ (8,300 Da) and $M_n$ (3,400 Da) and a relatively narrow size distribution (polydispersity of 2.44). Consistent with the results of degradation kinetics, the $M_w$ and $M_n$ of the mixture of alginate and the enzyme decreased from 15,800 to 2,200 and from 3,400 to 1,500 Da after two hours of reactions, respectively. Interestingly, the polydispersity of the mixture also decreased from 4.65 to 1.47 at the same time. The results indicated that the enzymatic reactions reduced the molecular weight and narrowed the size distribution of alginate. In other words, alginate lyase degraded large alginate molecules and shifted the molecular weight distribution to the lower end. As a result, the degree of polymerization of the alginate became less. Less polymerized alginate might have a lower fouling potential to the membranes.

TABLE 1

Molecular weight of alginate, the enzyme, and their mixture before and after reactions.

| Molecular weight (Da) | Unreacted alginate | Enzyme of alginate lyase | Initial mixture of alginate and the enzyme | Mixture reacted for 2 hrs |
|---|---|---|---|---|
| Weight-averaged ($M_w$) | 35,500 | 8,300 | 15,800 | 2,200 |
| Number-averaged ($M_n$) | 3,900 | 3,400 | 3,400 | 1,500 |
| Polydispersity ($M_w/M_n$) | 9.10 | 2.44 | 4.65 | 1.47 |

Membrane Filtrations of Alginate without Enzyme

Figure 2:
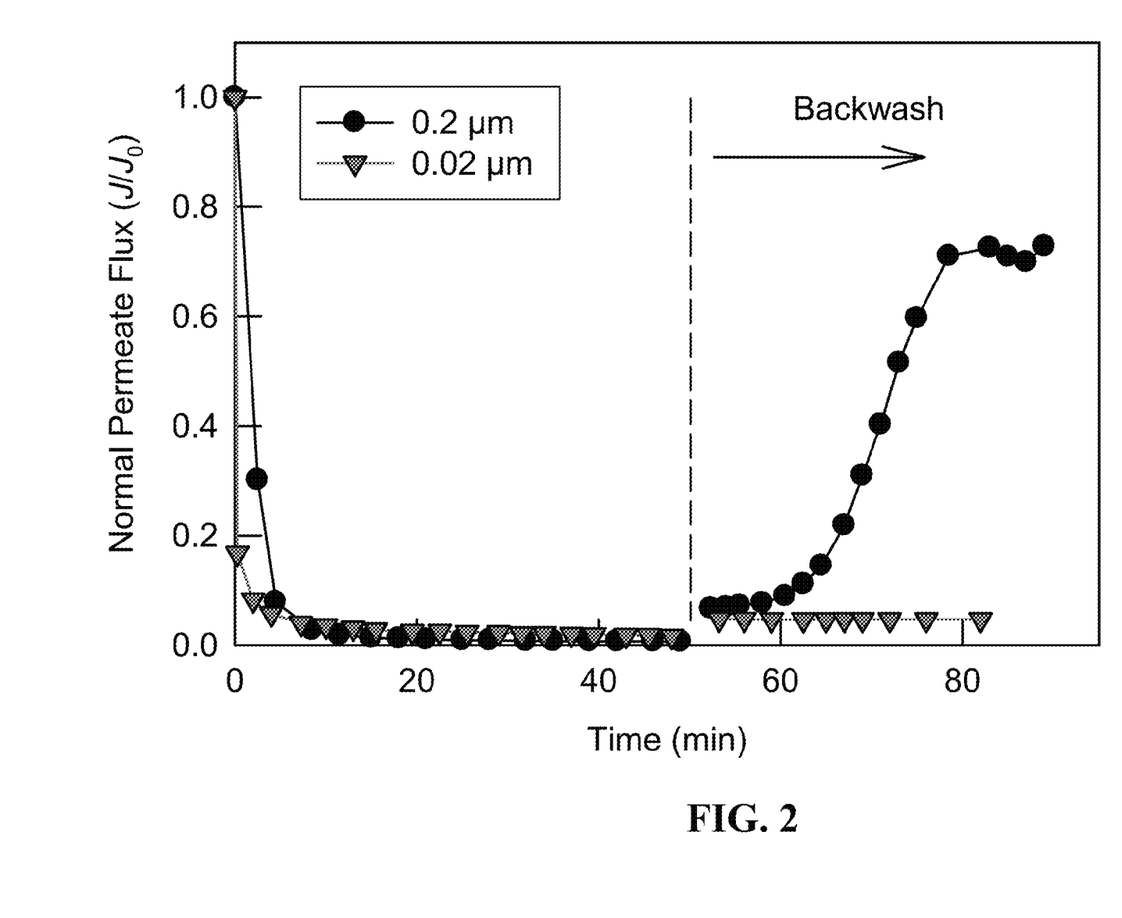
FIG. 2 illustrates the normalized permeate flux of 325 mg $L^{-1}$ alginate solution at approximately pH 6.7±0.2 through microfiltration (0.2 µm pore size) and ultrafiltration membranes (0.02 µm pore size) without the presence of enzyme or calcium.

Initial filtration tests investigated the fouling behaviors of alginate with 0.2 and 0.02 μm membranes without the presence of enzyme. As shown in FIG. 2, alginate alone caused significant membrane fouling at short filtration times, i.e., the normal permeate flux declined more than 90% in 4.5 minutes for both membranes. With the extension of filtration time after 10 minutes, a small and continuous decrease of the permeate flux was observed. Comparing the filtration curves of different membranes, more rapid fouling occurred with 0.02 μm membrane in the first 8 minutes followed by a plateau and a slightly higher normal permeate flux afterwards than 0.2 μm membrane. The normal permeate flux was plotted in FIG. 2. Note that the absolute permeate flux of 0.2 μm membrane was still larger than 0.02 μm membrane because of the greater clean membrane permeate flux ($J_0$).

At the end of the filtration for 50 minutes, backwashing was performed with DI water at 34.5 kPa. As illustrated in FIG. 2, backwashing gradually recovered the permeability of 0.2 μm membrane during the first 12.5 minutes. With an increased permeate flux of DI water passing through the membrane, a better cleaning effect is expected. Consequently, a sharp increase in permeate flux was observed, suggesting a rapid recovery of the membrane permeability. Finally, a peak permeate was reached. Overall, 30 minutes of backwashing of 0.2 μm membrane regained the normal permeate flux from 0.01 to 0.7. Conversely, no significant recovery was found with 0.02 μm membrane during backwashing, indicating the fouling was mostly irreversible. The normal permeate flux before and after backwashing was 0.02 and 0.05, respectively. The likely reason is that tighter membrane pores and possible pore blocking by foulants caused more headloss of the backwashing process. Therefore, the backwashing DI water passing through the membrane was too little to clean the fouled membrane effectively by shear-induced hydrodynamic diffusion.

Membrane Filtrations of Alginate Treated with enzyme

Figure 3:
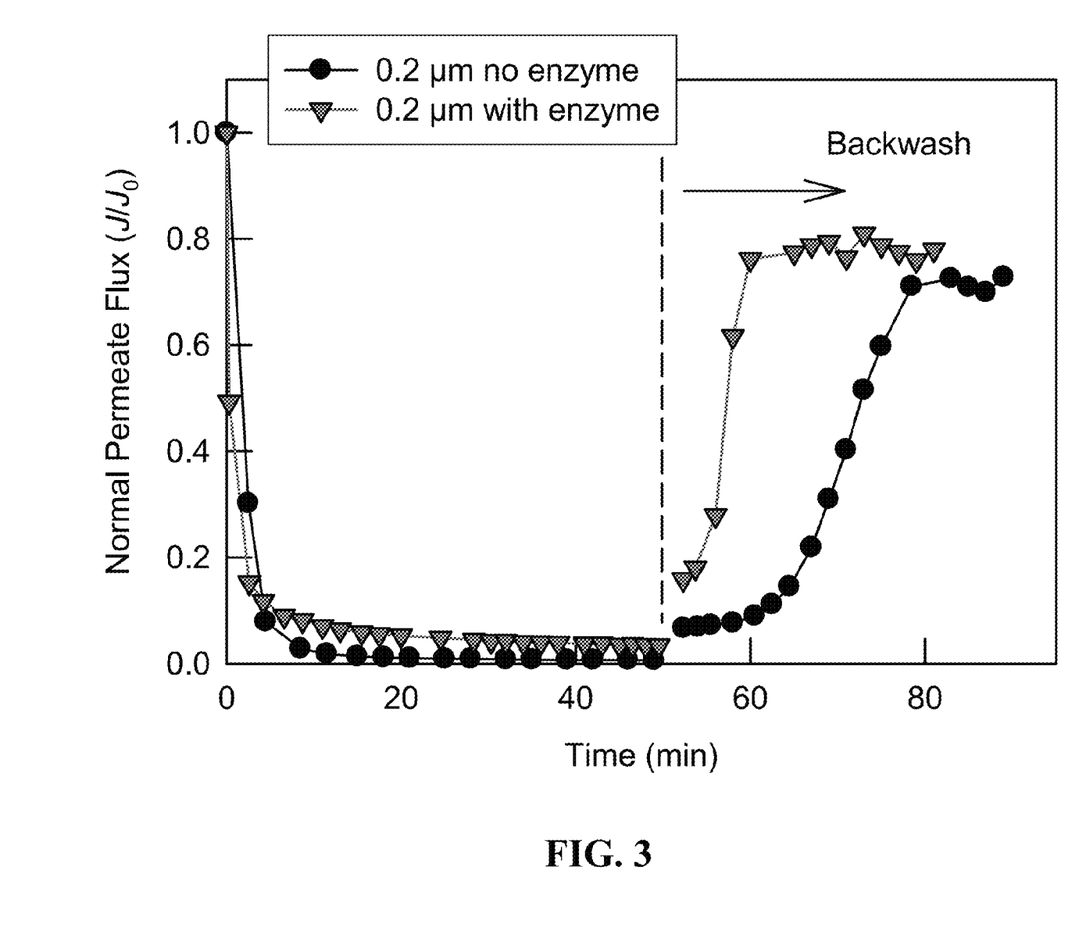
FIG. 3 compares the normalized permeate flux of a 0.2 µm membrane for filtration of 325 mg $L^{-1}$ original and enzymatically reacted alginate at approximately pH 6.7±0.2 without calcium. Alginate lyase concentration was 20 mg $L^{-1}$. Ionic strength was approximately 0.075 M.

Subsequent experiments examined how enzymatic reactions affected the fouling behaviors of alginate. Experimental results indicated that alginate lyase reduced fouling of both 0.2 and 0.02 µm membranes. FIG. 3 shows that the enzyme improved the permeate flux of 0.2 µm. After 50 minutes of filtration, the normal permeate was 0.03 and 0.007 with and without the enzyme, respectively. During backwashing, the enzymatically treated alginate was cleaned more rapidly and to a better degree than was the original alginate. More specifically, the normal permeate flux increased to 0.76 by backwashing in 10 minutes with the enzyme compared to 0.71 in 29 minutes for the 0.2 µm membrane fouled by original alginate without the enzyme. This result is consistent with the molecular weight analysis, i.e., enzymatic reactions depolymerized alginate and improved the diffusivity. Thus it had a less fouling potential and was more readily cleaned by backwashing.

Figure 4:
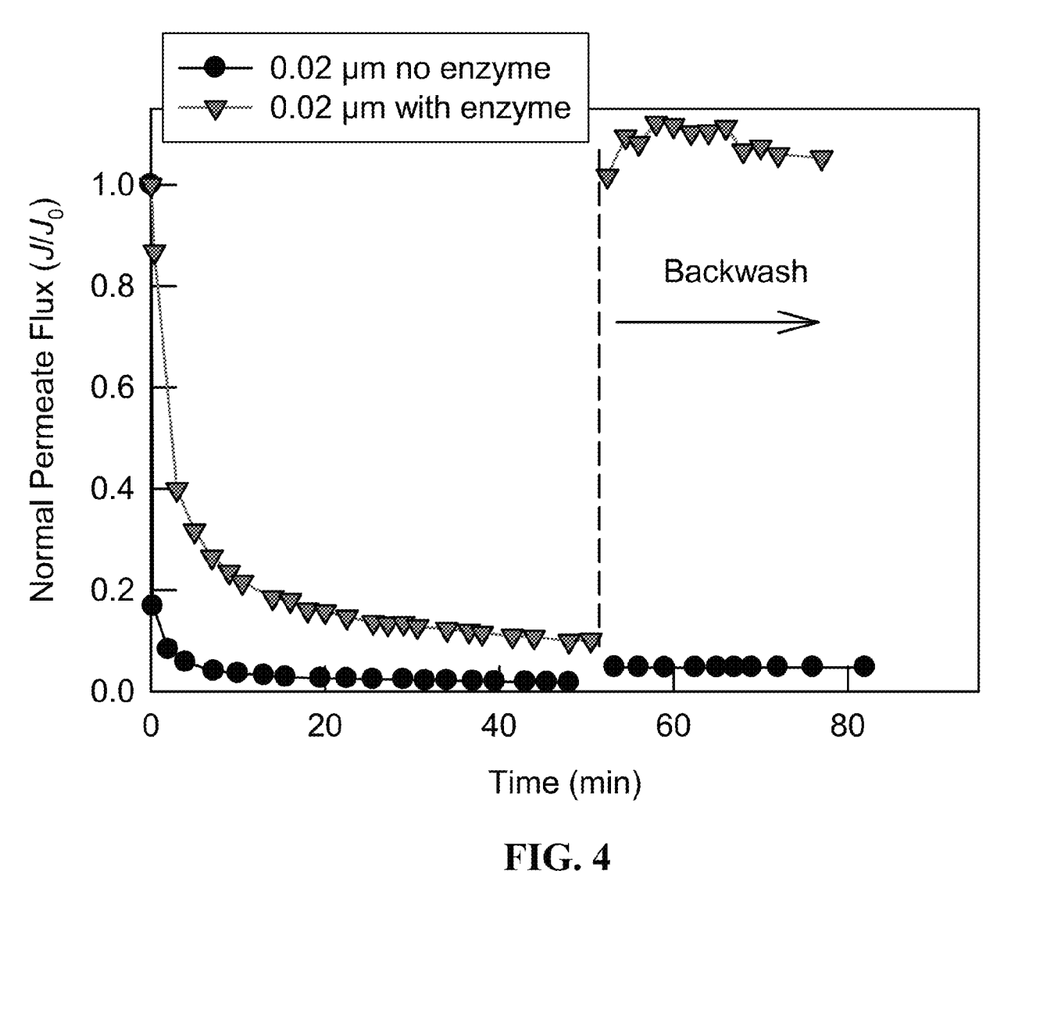
FIG. 4 compares the normalized permeate flux of a 0.02 µm membrane for filtration of 325 mg $L^{-1}$ original and enzymatically reacted alginate at approximately pH 6.7±0.2 without calcium. Alginate lyase concentration was 20 mg $L^{-1}$. Ionic strength was approximately 0.075 M.

Compared to 0.2 µm membrane, the enzyme showed a better effect of fouling reduction with 0.02 µm membrane. In FIG. 4, the permeate flux of enzymatically treated alginate was significantly higher than the original alginate in both filtration and backwashing stages. The backwashing recovered 100% of the clean membrane permeability in a few minutes. In contrast, the cleaning effect of backwashing was insignificant with the membrane fouled by the original alginate without the enzyme. These results suggest that alginate lyase made the fouling of the ultrafiltration membrane (0.02 µm) more reversible than the microfiltration membrane (0.2 µm). The likely explanation is that the shear-induced hydrodynamic diffusion is more important for the membranes of a smaller pore size. Tighter membranes have higher filtration resistance or head loss and thus causing a lower flow velocity in the pores. Enzymatically treated alginate of smaller molecules is easier to remove from the pores than the original alginate of larger molecules.

The following resistance-in-series model is used to calculate the resistance of the foulant to membrane filtration:

$$J = \frac{TMP}{\mu(R_m + R_f)} A$$

where, J is the membrane permeate flux (mL·s$^{-1}$). TMP is the transmembrane pressure (Pa). µ is dynamic viscosity of the permeate (Pa·s$^{-1}$). $R_m$ and $R_f$ is the resistance of the virgin membrane and the foulant (cm$^{-1}$), respectively. A is the membrane surface area (cm$^2$). In the equation, $R_m$ can be calculated by measuring the clean water permeate flux of the virgin membrane ($J_0$) through the equation of $$R_m = \frac{TMP}{\mu J_0} A.$$

The calculated resistance of the foulant and its ratio to the clean membrane resistance are shown in Table 2. Results indicated that alginate lyase reduced fouling and improved the permeate flux of both 0.2 and 0.02 µm membranes. More specifically, the ratio of the foulant resistance to the virgin membrane decreased from 154.1 to 28.3, and from 58.6 to 9.0 after enzymatic treatment for 0.2 and 0.02 µm membrane, respectively; which equals a fouling reduction of 82% and 85%, respectively. Significant improvements were found with the backwashing of 0.02 µm membrane fouled by enzymatically treated alginate, which recovered the permeability to 100%, suggesting the fouling was totally reversible and cleaned.

TABLE 2

Foulant resistance of the membranes in the presence and absence of the enzyme. Alginate concentration was 325 mg L$^{-1}$. Alginate lyase concentration was 20 mg L$^{-1}$. pH approximately 6.7 ± 0.2. Ionic strength was approximately 0.075M. No calcium.

| | Virgin membrane resistance | No enzyme | | | | With enzyme | | | |
|---|---|---|---|---|---|---|---|---|---|
| | | Foulant resistance after filtration | | Foulant resistance after backwash | | Foulant resistance after filtration | | Foulant resistance after backwash | |
| Membrane | ($R_m$) (cm$^{-1}$) | $R_f$ (cm$^{-1}$) | $R_f/R_m$ | $R_f$ (cm$^{-1}$) | $R_f/R_m$ | $R_f$ (cm$^{-1}$) | $R_f/R_m$ | $R_f$ (cm$^{-1}$) | $R_f/R_m$ |
| 0.2 µm | $9.23 \times 10^8$ | $1.42 \times 10^{11}$ | 154.1 | $3.45 \times 10^8$ | 0.4 | $2.62 \times 10^{10}$ | 28.3 | $2.61 \times 10^8$ | 0.3 |
| 0.02 µm | $2.80 \times 10^9$ | $1.64 \times 10^{11}$ | 58.6 | $5.61 \times 10^{10}$ | 20 | $2.53 \times 10^{10}$ | 9.0 | ~0 | ~0 |

Further experiments were conducted to investigate the effectiveness of alginate lyase under low dosage (i.e., approximately 0.5 mg L$^{-1}$ alginate lyase), low substrate concentration (i.e., approximately 8 mg L$^{-1}$ alginate), high pH (i.e., approximately pH 9.0±0.1), and in the presence of divalent cations (i.e., approximately 1 mM Ca$^{2+}$). The presence of divalent cations, such as Ca$^{2+}$ might enhance membrane fouling by i) charge neutralization of alginate through complexation with carboxylic functional group of alginate; and ii) bridging among deposited alginate macromolecules and the membrane, and thus forming a dense foulant structure.

Figure 5:
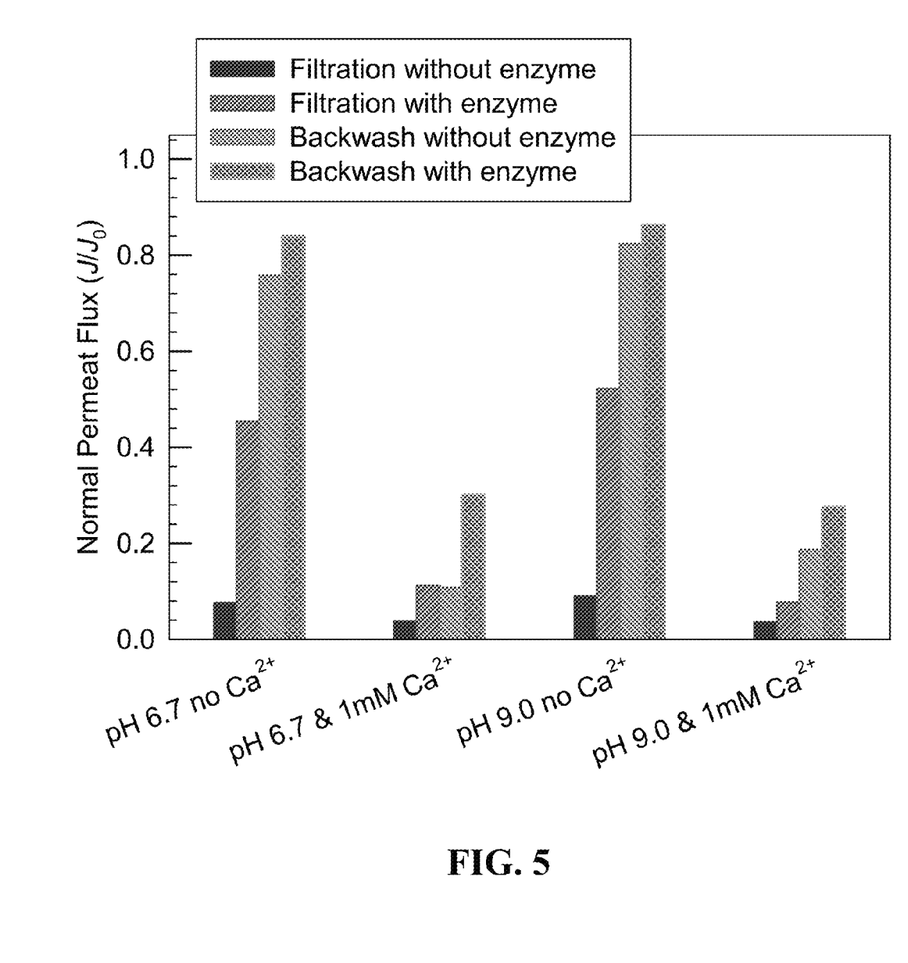
FIG. 5 compares the normalized permeate flux of 0.2 µm membrane for filtration of original and enzymatically reacted alginate. The permeate flux is compared at the ends of 60 minutes of filtration and 30 minutes of backwashing, respectively. Alginate concentration was 8 mg $L^{-1}$. Alginate lyase concentration was approximately 0.5 mg $L^{-1}$. Ionic strength was approximately 0.006 M.
Figure 6:
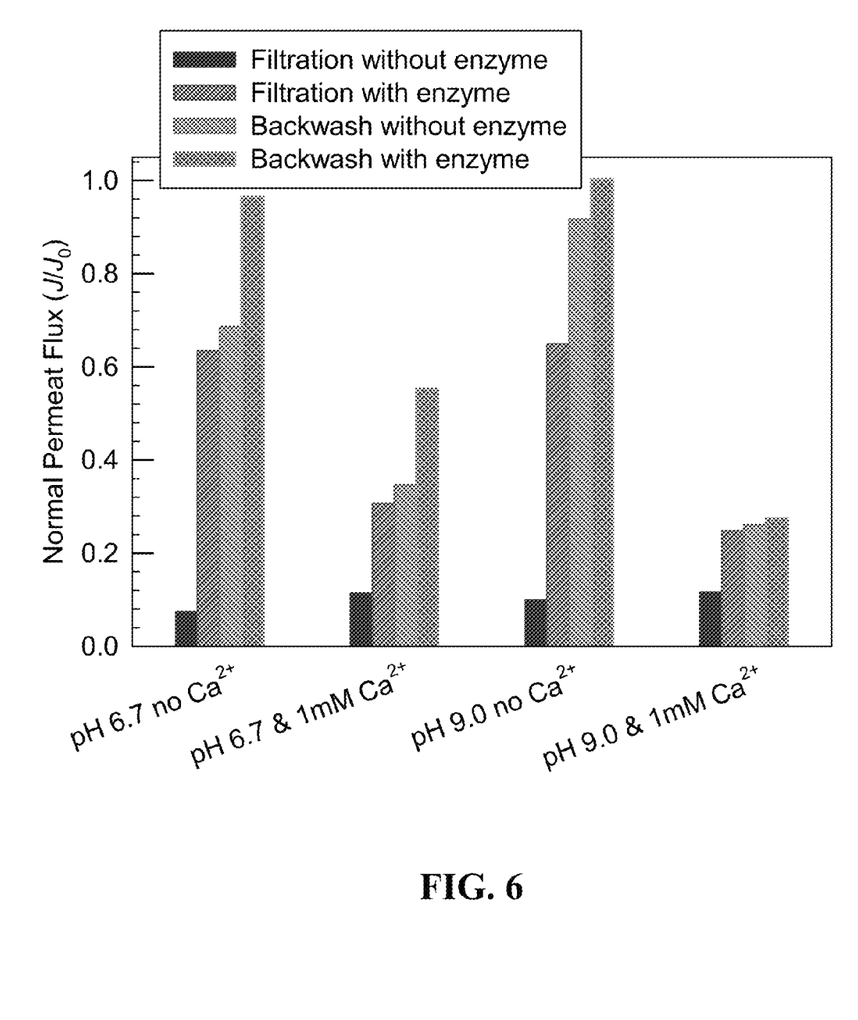
FIG. 6 compares the normalized permeate flux of 0.02 µm membrane for filtration of original and enzymatically reacted alginate. The permeate flux is compared at the ends of 60 minutes of filtration and 30 minutes of backwashing, respectively. Alginate concentration was 8 mg $L^{-1}$. Alginate lyase concentration was approximately 0.5 mg $L^{-1}$. Ionic strength was approximately 0.006 M.

As shown in FIGS. 5 and 6, alginate lyase significantly reduced membrane fouling and improved backwashing efficiency in all of the tests, suggesting alginate lyase worked at high pH, low dosage and in the presence of Ca$^{2+}$ also. During filtration without calcium, alginate lyase reduced the foulant resistance by more than 90% and 95% for 0.2 and 0.02 µm membrane, respectively, at both pH 6.7 and 9.0. During backwashing without calcium, alginate lyase made the fouling reversible, which was cleaned and recovered to a great extent. Especially for 0.02 µm membrane, higher than 92% to 100% of permeate recovery was obtained through backwashing.

However, the presence of 1 mM Ca$^{2+}$ decreased the permeate flux of both original and enzymatically reacted alginate during filtration and backwashing of 0.2 µm membrane, as illustrated in FIG. 5. Still, the enzyme improved the membrane filtration performance, just to a less extent. As mentioned before, the charge neutralization and bridging effects brought by Ca$^{2+}$ make fouling severe and difficult to clean through backwashing. Nevertheless, as shown in FIG. 6, there was an exception for 0.02 μm membrane filtration of alginate and 1 mM $Ca^{2+}$ without enzyme, in which higher permeate flux was observed with 1 mM $Ca^{2+}$ at both pH 6.7 and 9.0. A likely explanation is that bridging of alginate by $Ca^{2+}$ might increase the size of alginate and thus reduce the extent of membrane pore blocking of the 0.02 μm membrane. Overall, in the presence of 1 mM $Ca^{2+}$, alginate lyase reduced the foulant resistance by more than 55% and 60% for the 0.2 and 0.02 μm membrane, respectively. In addition, a greater permeate recovery rate through backwashing was also observed with the enzymatically treated alginate, even in the presence of 1 mM $Ca^{2+}$.

Conclusions

This disclosure indicated that the enzyme of alginate lyase significantly reduced membrane fouling caused by alginate. Alginate lyase catalytically depolymerized alginate macro molecules through the mechanism of β-elimination and reduced the molecular weight as evidenced by the spectra of size exclusion chromatography. Enzymatically treated alginate caused less fouling on both ultrafiltration and microfiltration membranes than original alginate at approximately pH 6.7±0.2 and approximately 9.0±0.1, ionic strength within the range of approximately 0.006 to approximately 0.075 M, and in the presence or absence of approximately 1 mM $Ca^{2+}$. Enzymatically treated alginate is predicted to cause less fouling on both ultrafiltration and microfiltration membranes than original alginate within the pH range of approximately 3.0 to approximately 10.0, ionic strength within the range of approximately 0.006 to approximately 1.0 M, and in the presence or absence of up to approximately 10 mM $Ca^{2+}$. At 325 mg $L^{-1}$ alginate, alginate lyase of 20 mg $L^{-1}$ reduced foulant resistance by 82% and 85% for 0.2 and 0.02 μm membranes, respectively, because the enzymatically treated alginate had a higher diffusivity and less affinity/attachment on the membrane pores/surfaces. At approximately 8 mg $L^{-1}$ alginate, alginate lyase of approximately 0.5 mg $L^{-1}$ reduced the foulant resistance by more than 90% without the presence of calcium. In the presence of 1 mM calcium cation, alginate lyase reduced the foulant resistance by more than 55%. In addition, the foulant structure composed of treated alginate was more readily removed by backwashing, suggesting reversible fouling. Compared to the 0.2 μm membrane, alginate lyase provided an enhancement of backwashing of the 0.02 μm membrane with a greater than 92% recovery rate obtained in the absence of calcium. Improved permeate recovery rate was also observed with enzymatically treated alginate in the presence of 1 mM $Ca^{2+}$.

It is proposed that alginate lyase is effective at concentrations higher than 20 mg $L^{-1}$ such as concentrations up to approximately 1 g $L^{-1}$. It is also envisioned that filtration using this method is effective at a range of pressures and temperatures. For example, it is proposed that the method is effective at any pressure within the range of approximately zero kPa to approximately 20 MPa. The membrane types include microfiltration, ultrafiltration, nanofiltration, reverse osmosis, and forward osmosis. It is also proposed that the method is effective at any temperature considered ambient temperature.

It is also proposed that alginate lyase is effective as an immobilized enzyme on the concentrate surface of a membrane. It is well known to employ a membrane that includes selective molecules of biologically active material, such as enzymes, that react selectively with an analyte to generate a signal, such as with a biosensor. Researchers have previously described the immobilization of enzymes to magnetic beads which can then be manipulated using magnetic fields. Such magnetic beads have previously been applied to waste-water treatment. In this proposed embodiment, it is proposed that alginate lyase may work as an immobilized enzyme to break down organic foulants, such as alginate and other polysaccharides, while a membrane is located in a process line within a filtration system.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A method of reducing membrane fouling by organic substances in water treatment, the method comprising:
   treating organic foulants by introducing alginate lyase to water containing alginate on a concentrate side of a membrane within a process line of a filtration system, wherein said introducing occurs at least 30 minutes prior to the water containing alginate and introduced alginate lyase contacting the filtration membrane.

2. The method of claim 1 wherein the alginate lyase is provided to water or wastewater in an amount effective to reduce membrane fouling.

3. The method of claim 2 wherein pH of the water containing alginate is within the range of approximately 3.0 to approximately 10.0 prior to said introducing.

4. The method of claim 2 wherein ionic strength of the water containing alginate is within the range of approximately 0.006 M to approximately 1.0 M prior to said introducing.

5. The method of claim 2 wherein the water containing alginate includes calcium cation, and wherein the concentration of calcium cation is within the range of approximately zero mM to approximately 10 mM.

6. The method of claim 1 wherein the alginate lyase is provided to water or wastewater in an amount effective to make fouling reversible with backwashing.

7. The method of claim 6 wherein the membrane is an ultrafiltration membrane.

8. The method of claim 7 where the ultrafiltration membrane has a pore size within the range of approximately 0.01 μm to approximately 0.1 μm pore size.

9. The method of claim 1 wherein the membrane is a ceramic membrane or a polymeric membrane.

10. The method of claim 1, comprising:
    introducing alginate lyase into a backwashing solution used by the filtration system to backwash the membrane.

11. The method of claim 1 further comprising:
    immobilizing the alginate lyase on the concentrate side of the membrane.

12. A method of promoting reversible membrane fouling by alginate in water treatment, the method comprising:
    filtering water containing alginate wherein a membrane is fouled by alginate during said filtering, and
    treating organic foulants by
        introducing alginate lyase to water containing alginate within a process line of a filtration system, wherein enzymatic reactions resulting from said introducing alginate lyase to water containing alginate begin at least 30 minutes prior to the water with introduced alginate lyase contacting the membrane or
        introducing alginate lyase in the backwashing solution within a process line of a filtration system.

13. The method of claim 12 wherein the membrane is a microfiltration membrane with a pore size within the range of approximately 0.1 µm to approximately 1.0 µm.

14. The method of claim 12 wherein alginate concentration is within the range of approximately 1 mg $L^{-1}$ to approximately 1000 mg $L^{-1}$ as measured by Chemical Oxygen Demand by Chromium (VI).

15. The method of claim 12 wherein alginate lyase concentration is any concentration up to approximately 20 mg $L^{-1}$.

16. The method of claim 12 wherein alginate lyase concentration is any concentration up to approximately 1 g $L^{-1}$.

17. The method of claim 12 wherein filtration is performed at ambient temperature and within the range of approximately zero kPa to approximately 20 MPa.

18. The method of claim 12 further comprising:
backwashing the membrane.

19. The method of claim 12, comprising decreasing the affinity and fouling potential of alginate to a membrane.

20. The method of claim 1, wherein said introducing alginate lyase occurs while the water containing alginate is being filtered.

21. The method of claim 1 wherein the membrane is selected from the group consisting of: a microfiltration membrane, an ultrafiltration membrane, a nanofiltration membrane with a pore size within the range of approximately 0.0001 µm to approximately 0.01 µm, a reverse osmosis membrane, and a forward osmosis membrane.

22. The method of claim 1, wherein said introducing alginate lyase occurs on a feed side of a forward osmosis filtration process.

23. The method of claim 1, comprising
selecting the pore size of the membrane to be smaller than the molecular size of the alginate lyase; and
retaining the alginate lyase on the concentrate side of the membrane, the molecular size of the alginate lyase being larger than the membrane pore size.

24. The method of claim 1, wherein said introducing occurs about 2 hours prior to the water with alginate and introduced alginate lyase contacting the filtration membrane.

25. A method of reducing membrane fouling by alginate in water treatment, the method comprising:
introducing alginate lyase to water containing alginate within a process line of a filtration system, wherein enzymatic reactions resulting from said introducing alginate lyase to water containing alginate begin at least 30 minutes prior to the water containing alginate and introduced alginate lyase contacting a filtration membrane within said filtration system.

* * * * *